United States Patent [19]

Yoshihara et al.

[11] Patent Number: 5,061,429

[45] Date of Patent: Oct. 29, 1991

[54] METHOD OF FORMING A GASKET ON WINDOW SHAPING MOLD FOR PREPARING SUCH WINDOW GLASS

[75] Inventors: Noriyuki Yoshihara; Yoshio Hosaka, both of Yokohama; Shigehito Shibata, Sagamihara; Nobuaki Kunii, Yokohama, all of Japan

[73] Assignee: Asahi Glass Company Ltd., Tokyo, Japan

[21] Appl. No.: 390,218

[22] Filed: Aug. 7, 1989

[30] Foreign Application Priority Data

Aug. 9, 1988 [JP] Japan ................................ 63-197075

[51] Int. Cl.⁵ ............................................ B29C 45/33
[52] U.S. Cl. ...................................... 264/252; 264/314; 264/328.9; 425/116; 425/117; 425/419; 425/577
[58] Field of Search ................... 264/252, 328.8, 328.9, 264/328.7, 314; 249/65, 83, 123, 124, 162, 167; 425/110, 116, 117, 121, 129.1, 577, 405.1, 419

[56] References Cited

U.S. PATENT DOCUMENTS

| | | | |
|---|---|---|---|
| 4,561,625 | 12/1985 | Weaver | 249/85 |
| 4,584,155 | 4/1986 | Zanella | 264/155 |
| 4,626,185 | 12/1986 | Monnet | 425/110 |
| 4,688,752 | 8/1987 | Barteck et al. | 249/85 |
| 4,688,752 | 8/1987 | Barteck et al. | 249/85 |
| 4,732,553 | 3/1988 | Hofer | 264/252 |
| 4,761,916 | 8/1988 | Sanok et al. | 49/381 |

FOREIGN PATENT DOCUMENTS 63-67125 9/1987 Japan .
8704973 5/1985 World Int. Prop. O. .

Primary Examiner—Jay H. Woo
Assistant Examiner—Jeremiah F. Durkin, II
Attorney, Agent, or Firm—Oblon, Spivak, McClelland, Maier & Neustadt

[57] ABSTRACT

A method of preparing window glass provided with a gasket at a peripheral portion of a glass sheet for a window includes placing a glass sheet in a shaping mold which has two mold parts to provide an inner cavity in which resilient sealing members are attached respectively to the two mold parts so as to come in contact with surfaces of the glass sheet so that a gasket forming cavity is formed at a peripheral area of the glass sheet by the cooperation of the inner cavity of the shaping mold, the resilient sealing members and the glass sheet. The resilient sealing member is then pushed to the contacting surface constituted by the resilient sealing member and a part of the shaping mold in the inner cavity via a pushing means after the assembling of the shaping mold and the glass sheet. A gasket material is then injected into the gasket forming cavity to form a gasket.

16 Claims, 6 Drawing Sheets

METHOD OF FORMING A GASKET ON WINDOW SHAPING MOLD FOR PREPARING SUCH WINDOW GLASS

BACKGROUND OF THE INVENTION

1. Field of the Invention

The present invention relates to a method of preparing window glass with a gasket suitably used for window glass for automobiles and buildings, and a shaping mold used for preparing such window glass with a gasket.

2. Description of the Related Art

There have been practiced to attach a gasket or a mole (hereinafter, referred to as a gasket), which is a shaped product of rubber, elastomer or a synthetic resin, in order to apply a decorative trim strip or a seal at a glass sheet for windows of a vehicle such as an automobile or a building.

In attaching the gasket to the window glass, there have been known to use such a method that a gasket previously shaped by an extrusion process is bonded to a peripheral portion of the window glass or is fitted thereto. However, such method requires a number of working steps and much labor, and therefore it is not economical.

In order to solve the above-mentioned problems, there has been proposed a method of preparing window glass with a gasket by forming the gasket integrally with a peripheral portion of the window glass. An example of this method will be described with reference to FIG. 5.

A glass sheet 1 to be fitted to a window is placed in a shaping mold 2 so that the glass sheet 1 is interposed between upper and lower mold parts 3, 4, whereby a gasket forming cavity 5 is formed by the inner surfaces of the upper and lower mold parts 3, 4 and the outer peripheral portion of the glass sheet 1. Resilient sealing members 6, 7 are respectively disposed at portions where the upper and lower mold parts 3, 4 and the surfaces of the glass sheet 1 are in contact, in order to seal the surfaces of the glass sheet 1. Then, a gasket material such as a molten product of rubber, elastomer or a synthetic resin, or a mixture of materials capable of forming rubber, elastomer or a synthetic resin is injected into the cavity 5 followed by solidifying the gasket material, whereby the gasket is formed at a peripheral portion of the glass sheet 1 in one piece. Then, the upper and lower mold parts 3, 4 are separated from each other and the glass sheet to which the gasket is firmly attached is removed from the shaping mold 2. The above-mentioned method of preparing the window glass with a gasket is disclosed in, for instance, U.S. Pat. Nos. 4,761,916, 4,561,625, 4,584,155, 4,626,185, 4,688,752 and Japanese Unexamined Patent Publication 158481/1982.

In the conventional method of preparing the window glass with a gasket, however, the resilient sealing member is deformed due to a pressure of injection when the gasket material is injected and a space is produced between the shaping mold and the resilient sealing member. When the injected material enters in the space and solidifies in it, burrs are resulted and they deteriorate the outer appearance of the molded product, and it is difficult to remove the molded product from the shaping mold, or the apparent elasticity of the resilient sealing member becomes hard with the result of reducing the glass sheet cracking prevention effect.

In order to prevent the injected material from entering in the space between the resilient sealing member and the shaping mold when the gasket is molded, there is proposed to use a relatively hard resilient sealing member which is not deformed by a pressure of injection, or to strongly push the resilient sealing member to the shaping mold. However, either of these methods makes the resilient sealing member substantially hard whereby flexibility in the sealing member is lost. As a result, a stress is apt to gather at the glass sheet 1 owing to the lack of uniformity in shape of the shaping mold 2, the resilient sealing members 6, 7 and the glass sheet 1, so that the glass sheet 1 placed in the shaping mold 2 is easily broken. The breakage of the glass sheet is in particular apt to occur in a case that the glass sheet 1 has a complicated bent portion, or has a deeply bent portion (such as a small radius curvature or a large bending angle). Further, accuracy in the radius of curvature of the glass sheet 1 having been subjected to bending operations is sometimes insufficient. The lack of uniformity in shape of the glass sheet 1 results in breakage of it. When a sheet of window glass is not flat, namely, it is deeply bent, it is sometime difficult to seal the window glass by means of a resilient sealing member. For instance, when a sheet of window glass is a flat glass plate as shown in FIG. 5, the directions of force by the resilient sealing members 6, 7 against the surfaces of the glass sheet 1 are the same as the direction of assembling the upper and lower mold parts 3, 4 (mold-fastening directions). Namely, the resilient sealing members 6, 7 are respectively pushed to the surfaces of the glass sheet 1 by a mold-fastening pressure. However, when a glass sheet deeply bent is used, it is not always that the direction of the mold-fastening pressure is identical with the direction of forcing the resilient sealing member to the surface of the glass sheet. Accordingly, when the direction of the mold-fastening pressure is not the same as the direction of forcing the resilient sealing member, sealing effect by the resilient sealing member is insufficient, whereby leakage of the gasket material injected in the gasket forming cavity is easily caused.

SUMMARY OF THE INVENTION

It is an object of the present invention to eliminate the above-mentioned problems in the conventional method and to provide a method of preparing window glass with a gasket and a shaping mold used for carrying out the method which is capable of providing sufficient sealing effect even when window glass has a complicated curved portion or a deeply bent portion.

In accordance with the present invention, there is provided a method of preparing window glass provided with a gasket at a peripheral portion of a glass sheet for a window characterized by comprising placing a glass sheet in a shaping mold which comprises at least two mold parts to provide an inner cavity in which at least one resilient sealing member is attached to at least one of the two mold parts so as to come in contact with a surface of the glass sheet so that a gasket forming cavity is formed at a peripheral area of the glass sheet by the cooperation of the inner cavity of the shaping mold, the resilient sealing member and the glass sheet, pushing the resilient sealing member to the contacting surface constituted by the resilient sealing member and a part of the shaping mold in the inner cavity by means of a pushing means at the same time of or after the assembling of the shaping mold and the glass sheet, and injecting a gasket material into the gasket forming cavity to form a gasket.

In this invention, the resilient sealing member is pushed to a part of the inner cavity wall of the shaping mold to thereby make the resilient sealing member close contact with the part of the shaping mold, whereby a danger of producing a space at the contacting surface of the both elements by the deformation of the resilient sealing member can be minimized. Further, a danger of leaking the gasket material from the gasket forming cavity through the space owing to the inner pressure of the gasket forming cavity can be minimized.

In the present invention, it is possible to push the resilient sealing member to the glass sheet by means of a pushing means other than the mold-fastening pressure. Accordingly, sufficient sealing effect can be achieved even though the direction of pushing the resilient sealing member to the glass sheet is different from the direction of fastening the mold parts.

In accordance with the present invention, there is provided a method of preparing window glass provided with a gasket at a peripheral portion of a glass sheet for a window characterized by comprising placing a glass sheet in a shaping mold which comprises at least two mold parts to provide an inner cavity in which at least one resilient sealing member is attached to at least one of the two mold parts so as to come in contact with a surface of the glass sheet so that a gasket forming cavity is formed at a peripheral area of the glass sheet by the cooperation of the inner cavity of the shaping mold, the resilient sealing member and the glass sheet, pushing the resilient sealing member to a part of the inner cavity wall of the shaping mold in a direction other than perpendicular to the surface of the glass sheet to which the resilient sealing member contacts to thereby push the resilient sealing member to the glass sheet, and injecting a gasket material into the gasket forming cavity to form a gasket.

Further, in accordance with the present invention, there is provided a shaping mold for preparing window glass comprising a glass sheet with a gasket formed at its peripheral portion which comprises at least two mold parts to provide an inner cavity when assembled wherein at least one of the two mold parts is provided with a resilient sealing member which is in contact with a surface of a glass sheet placed in the inner cavity so as to define a gasket forming cavity from the inner cavity, and a pushing means capable of pushing the resilient sealing member to the inner cavity wall of the shaping mold at the same time of or after the assembling of the shaping mold and the glass sheet.

In the above-mentioned invention, the shaping mold consists of at least two mold parts. The glass sheet is placed in the shaping mold under the condition that the two mold parts are separated from each other, and then, the two mold parts are assembled in which the glass sheet is contained. The shaping mold is typically of a two-spirit type wherein two mold parts are separable in the vertical direction. In this text, the upper part is referred to as an upper mold part and the lower part is referred to as a lower mold part. However, the shaping mold of the present invention is not limited to the above-mentioned embodiment, and a shaping mold separable into three or more pieces or separable in the right and left directions may be used.

The resilient sealing member is provided at least one mold parts of the shaping mold so as to be in contact with the glass sheet for effecting sealing. The resilient sealing member may be provided at all mold parts which are contact with the glass sheet. All resilient sealing members may be pushed by respective pushing means which will be described hereinafter. In the shaping mold consisting of the upper and lower mold parts, the resilient sealing member and a pushing means may be attached to each of the upper and lower mold parts. Or, the resilient sealing member and the pushing means may be provided at the upper mold part while the lower mold part is provided with no the resilient sealing member or only the resilient sealing member. A pushing force for combining the upper and lower mold parts is so-called a mold-fastening pressure which keeps the shaping mold in a closing state against an inner pressure in the inner cavity.

The gasket is formed entirely or partly at the peripheral area of the glass sheet. For instance, the gasket may be formed at the entire periphery of a rectangular glass sheet, or one, two or three side areas, or a part of one side area of it. In many case, the gasket is provided at the entire peripheral area of the front window glass, the rear window glass or a fixed side window glass of an automobile. In the present invention, a metal fitting or fittings for fitting a window glass sheet to a frame may be attached to the glass sheet in one piece. For instance, a metal fitting is placed in the cavity to be embedded in the gasket when the gasket is formed by molding. Or, the metal fitting is bonded to the gasket so that the metal fitting is fitted to the window glass sheet together with the gasket.

The resilient sealing member is provided at a mold part or mold parts of the shaping mold in correspondence to the gasket forming cavity. The resilient sealing member is a strip-like body which may have various kinds of shape in cross section. As a material for the resilient sealing member, elastomeric materials such as natural rubbers, and synthetic rubbers, synthetic resin elastomers may be used. For instance, there may be used synthetic rubbers such as butadiene rubber, isoprene rubber, chloroprene rubber, acryl rubber, acrylate-butadiene rubber, isobutene-isoprene rubber, nitrile-butadiene rubber, nitrile-chloroprene rubber, chlorosulfonated polyethylene rubber, styrene-butadiene rubber, styrene-chloroprene rubber, styrene-isoprene rubber, ethylene-propylene rubber, ethylene-propylenediene terpolymer, urethane rubber, silicone rubber, fluorine rubber, epichlorohydrin rubber, norbornene rubber and polyether rubber, silicone elastomers, polyurethane elastomers and other synthetic elastomers. They can be selected in consideration of the heat resistance properties, injection molding pressures, and the durability to materials to be injected. It is preferable to use any material having the Young's module in a range of 1–5,000 kg/cm$^2$, and more preferably, in a range of 10–500 kg/cm$^2$ from the standpoint of assuring sealing effect and preventing the breakage of the glass sheet. The shape in cross section of the resilient sealing member is not limited, and a resilient sealing member having a square, circular elliptic, polygonal shape in cross section may be used. Or, a resilient sealing member having a groove at its part or a bore may be used in order to obtain a desired Young's module.

As means for pushing the resilient sealing member, a cylinder-driven mechanism utilizing a fluid pressure, a motor-driven mechanism, a spring mechanism, a slide mechanism or other suitable means, or any combination of these mechanisms may be used. Among these mechanisms, the cylinder-driven mechanism is most preferably used. In order to drive the cylinder, a fluid pressure obtained by using air or oil may be preferably utilized. However, any suitable pressure source may be used as far as the cylinder can be actuated.

Any suitable material can be used for the shaping mold. For instance, metal such as iron, aluminum, an alloy, FRP, polymer concrete, or concrete may be preferably used.

DETAILED DESCRIPTION OF THE PREFERRED EMBODIMENTS

Preferred embodiments of the present invention will be described with reference to the drawings.

Figure 1:
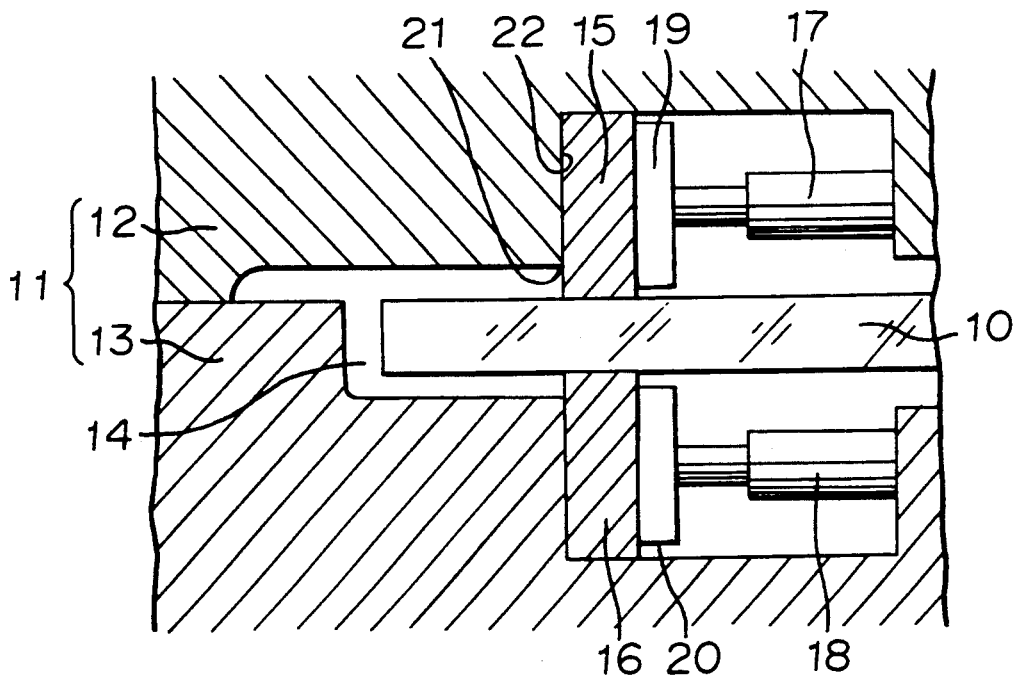
FIG. 1 is a longitudinal cross-sectional view partly omitted of a shaping mold used for carrying out the method of the present invention.

FIG. 1 shows an embodiment of the shaping mold in an assembled state in which a glass sheet is held in the lateral direction. A shaping mold 11 consists of an upper mold part 12 and a lower mold part 13 which are assembled in the vertical direction in which a glass sheet 10 is contained. An inner cavity 14 is formed by the cooperation of the inner surface of the shaping mold 11 and the surfaces at the peripheral area of the glass sheet 10. The upper mold part 12 is provided with a resilient sealing member 15 which is in contact with the glass sheet 10. Similarly, the lower mold part 13 is provided with a resilient sealing member 16 in contact with the glass sheet 10. The resilient sealing members 15, 16 are respectively urged to the left side surface of the inner cavity 14 in FIG. 1 by pressing plates 19, 20 which are, in turn, pushed by respective pushing means such as fluid-pressure driven cylinders 17, 18. The resilient sealing member 15 is pushed to a contacting surface (where the upper mold part 12 and the resilient sealing member 15 are contact with each other, and which is shown as a line in FIG. 1) in a part of the surface wall of the inner cavity 14, the contacting surface including a border line 21 (which is indicated by a point in the cross-sectional view of FIG. 1) which defines the border between the upper mold part 12 and the resilient sealing member 15. By the presence of the resilient sealing member 15, a gasket material is prevented from leaking from the cavity 14 through the border line 21 toward the contacting surface 22. The same function and effect can be obtained in the case of the resilient sealing member 16 provided in the lower mold part 13.

In FIG. 1, the direction of pushing the resilient sealing members 15, 16 is in parallel to the both surfaces of the glass sheet 10 and opposite the direction (in the right direction) of a force applied to the resilient sealing members 15, 16 by the pressure of the gasket material injected in the gasket forming cavity 14. Accordingly, the force caused by the inner pressure of the gasket forming cavity 14 is against forces for causing the deformation of the resilient sealing members 15, 16, and the gasket material is prevented from leaking through the contacting surfaces between the glass sheet 10 and the resilient sealing members 15, 16. On the other hand, forces caused by the deformation of the resilient sealing members 15, 16 increase sealing properties at the contacting surfaces of the glass sheet 10 and the resilient sealing members 15, 16. The forces can be adjusted by the pushing means.

Figures 2A, 2B:
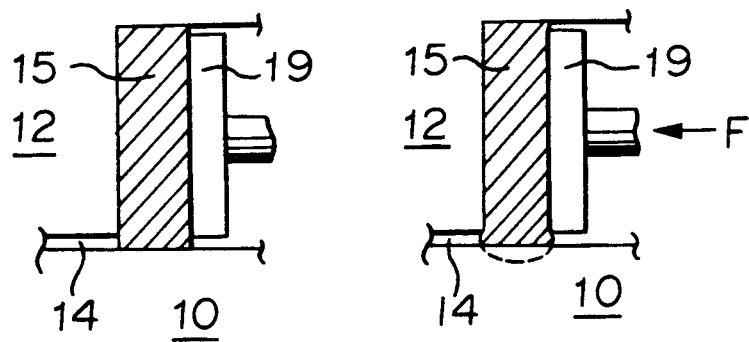
FIGS. 2A and 2B are respectively cross-sectional views showing a part of the shaping mold in different processing stages.

FIGS. 2A and 2B are respectively cross-sectional views showing the resilient sealing member 15 as in FIG. 1 wherein FIG. 2A shows the resilient sealing member 15 in a state that no pushing force is applied and FIG. 2B shows a state that the pushing force is applied to the resilient sealing member 15. In FIG. 2A, the resilient sealing member 15 is pushed to a surface of the glass sheet 10 by a mold-fastening pressure in the vertical direction in FIG. 1, i.e. a pushing force for matching the two mold parts. In this condition, when a pushing force F is applied to the resilient sealing member 15 in the left direction (FIG. 2B), the resilient sealing member 15 is deformed to become a shape as indicated by a dotted line. The force causing the deformation of the resilient sealing member 15 further, pushes the sealing member 15 to the glass sheet in addition to the pushing force by the mold-fastening pressure. Accordingly, it is possible to adjust the pushing force of the resilient sealing member 15 to the glass sheet by adjusting the pushing force F applied to the resilient sealing member 15. This provides a large advantage from the viewpoint of the improvement of sealing properties as well as the minimization of a possibility of breaking the glass sheet. For instance, if the resilient sealing member is pushed to the glass sheet by only the mold-fastening pressure, an excessive pushing force is locally concentrated to the glass sheet to thereby cause possible breakage of it. When the pushing force is too small, there results the leakage of the gasket material. Or, the breakage of the glass sheet and the leakage of the gasket material may occur simultaneously at different portions of the glass sheet. In this case, a pushing force to respective portions of the resilient sealing member can be adjusted so that the resilient sealing member can be pushed to the glass sheet with a uniform pushing force as a whole. It is especially effective to adjust the pushing force when the direction of the mold-fastening pressure is different from the pushing force for pushing the resilient sealing member to the glass sheet in such a case that a gasket is to be formed at the peripheral area of a glass sheet deeply bent. In this case, it is impossible to obtain sufficient sealing effect by only applying the mold-fastening pressure. Further, a uniform pushing force can be obtained to the glass sheet even though the uniform pushing force is applied to the entire surface portion of the resilient sealing member because the shape of the glass sheet is locally different.

A typical method of preparing window glass with a gasket by using the shaping mold having the above-mentioned construction will be described.

As shown in FIG. 1, the glass sheet 10 is disposed between the upper and lower mold parts 12, 13. Then, by combining these upper and lower mold parts 12, 13, the inner cavity 14 is formed by the cooperation of the inner surfaces of the upper and lower mold parts 12, 13 and the surface at the peripheral portion of the glass sheet 10, whereby the resilient sealing members 15, 16 are respectively pushed with elasticity to the surfaces of the glass sheet by a mold-fastening pressure. The resilient sealing members 15, 16 are deformed with elasticity and are in close-contact with the surfaces of the glass sheet depending on the shape of it. Accordingly, there is obtainable excellent sealing without causing a concentrated stress to the glass sheet 10.

Then, the resilient sealing member 15 is pushed to the contacting surface 22 of the upper mold part 12 by applying a fluid pressure to the pushing means. At the same time, the resilient sealing member 16 is pushed to the lower mold part 13 in the same manner as the resilient sealing member 15, whereby pushing forces to the glass sheet 10 by the resilient sealing members 15, 16 are increased. The increased pushing forces can be obtained by forcing the resilient sealing members 15, 16 to the contacting surface 12.

Then, the gasket material is injected into the gasket forming cavity 14. A gasket is formed by solidifying the gasket material. Then, the fluid-pressure-driven cylinders 17, 18 are moved back to separate the upper and lower mold parts 12, 13 so that the glass sheet with the gasket can be removed.

Figure 3:
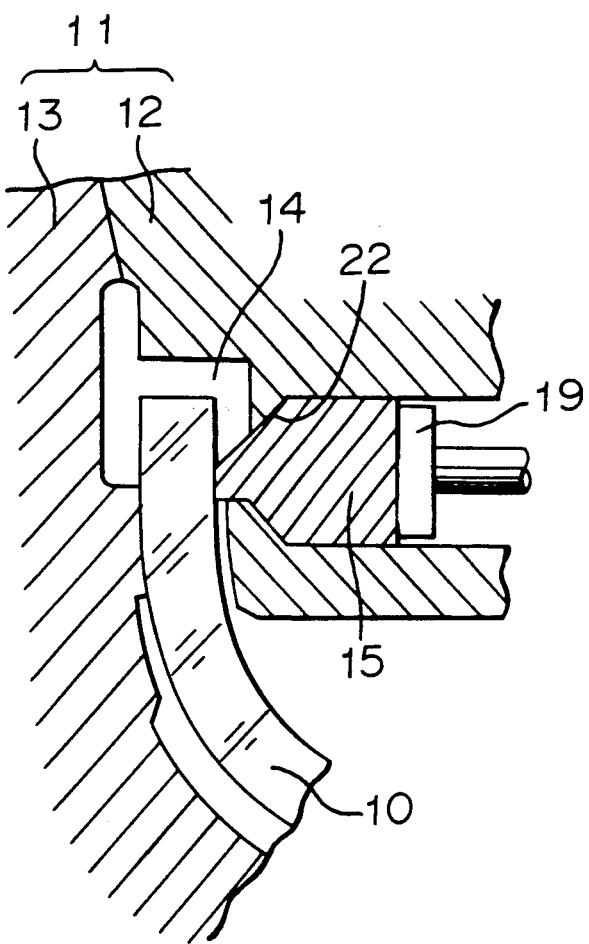
FIG. 3 is a longitudinal cross-sectional view partly omitted of another embodiment of the shaping mold of the present invention.

FIG. 3 is a longitudinal cross-sectional view of an important part of an embodiment of the shaping mold used for the method of the present invention. In FIG. 3, the same reference numerals designate the same or corresponding parts. The glass sheet 10 is bent at the portion near its peripheral portion. A shaping mold 11 consists of an upper mold part 12 and a lower mold part 13. A resilient sealing member 15 is provided at the upper mold part 12. The resilient sealing member 15 is pushed to the glass sheet 10 in the direction perpendicular to its surface by means of a pressing means (not shown). The direction of fastening the upper and lower mold parts 12, 13 of the shaping mold 11 is the vertical direction in FIG. 3. Accordingly, a force for pushing the surface of the glass sheet placed in substantially vertical direction to the mold-fastening direction owes to a force given by the pressing means for pressing the resilient sealing member 15. Namely, the mold-fastening pressure does not substantially contribute sealing effect. In the embodiment as shown in FIG. 3, the resilient sealing member 15 is not pushed by a pushing force directing in substantially parallel to the glass sheet. However, since the contacting surface 22 of the resilient sealing member 15 and the upper mold part 12 is slanted, the resilient sealing member 15 is pushed to the contacting surface 13 by the pushing force to thereby prevent the gasket material from leaking to the contacting surface from the gasket forming cavity 14. In order to obtain the perfect sealing effect, it is necessary to incline the contacting surface 22 to the direction of the pushing force to the resilient sealing member 15. Preferably, an angle of inclination between the direction of the pushing force to the resilient sealing member 15 and the contacting surface 22 is in a range of 0°–90°. The method of preparing the window glass with a gasket by using the shaping mold as shown in FIG. 3 is the same as that described with reference to FIG. 1.

Figure 4:
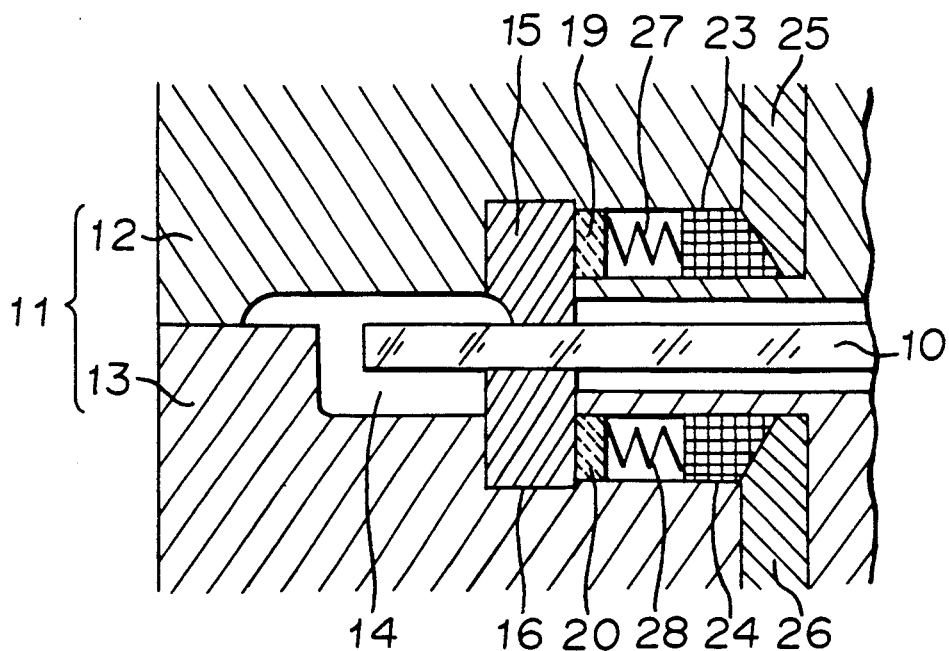
FIG. 4 is a longitudinal cross-sectional view partly omitted of another embodiment of the shaping mold of the present invention.
Figure 5:
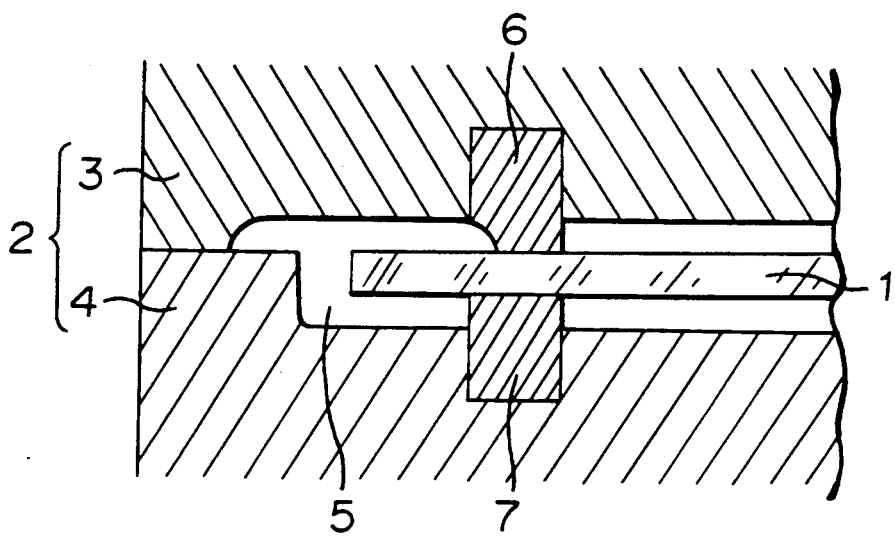
FIG. 5 is a longitudinal cross-sectional view partly omitted of a conventional shaping mold for producing window glass with a gasket.

FIG. 4 is a longitudinal cross-sectional view of an important part of an embodiment of the shaping mold used for the method of the present invention.

In this embodiment of the shaping mold, there are provided slide cores 23, 24 and cotters 25, 26 so that the resilient sealing members 15, 16 are independently and slidingly movable in the shaping mold. The resilient sealing members 15, 16 are respectively pushed to the shaping mold through pressing plates 19, 20 and springs 27, 28 in association with opening and closing operations of the shaping mold. As the springs 27, 28, coil springs, leaf springs or another suitable springs may be used. Further, resilient sealing members such as rubber, elastomer and so on may be used instead of the springs 27, 28. Although they are used to control pressing forces between the resilient sealing members 15, 16 and the shaping mold, they may be omitted when the Young's module of the resilient sealing members 15, 16 is small. Further, it is possible to use only springs and omit the slide mechanism.

The method of preparing window glass with a gasket by using the shaping mold as shown in FIG. 4 is the same as that described with reference to FIG. 1 except that the resilient sealing members 15, 16 are pushed to or released from the shaping mold by the sliding mechanism comprising the slide cores 23, 24 and the cotters 25, 16 instead of actuating the fluid-pressure-driven cylinders. The slide mechanism can be actuated by using another driving source instead of using the mold-fastening pressure. For instance, the slide mechanism can be actuated by the above-mentioned fluid-pressure-driven cylinders.

In the shaping molds as shown in FIGS. 1, 3 and 4, the position of the upper mold part 12 which contacts the glass sheet 10 faces the position of the lower mold part 13 which contacts the glass sheet 10 at the same position. However, another suitable construction such that the position of the contacting surface of the upper and lower mold parts 12, 13 to the window glass 10 is shifted each other.

The window glass used in the present invention is made of an inorganic glass sheet or a laminated body of a plurality of the inorganic glass sheets. For instance, a single inorganic glass sheet, a laminated glass sheet by laminating two inorganic glass sheets with an interlayer, a double-layered glass in which two inorganic glass sheets are opposed with a space and their peripheral portions are sealed, or bi-layered glass in which a polyurethane film or a polyethylene terephthalate film is laminated on a surface of a single inorganic glass sheet or on a laminated glass sheets may be used. A window glass sheet having a curved portion, a window glass sheet subjected to strengthening operations or a window glass sheet having a functioning layer such as a heat radiation reflecting layer may be used. Especially, an inorganic glass sheet or a laminated body of the glass sheets having a curved portion, subjected to strengthening operations or without strengthening operations is preferably used. The window glass with a gasket is preferably used for a window glass for automobiles, buildings and so on, more preferably for the front window or the rear window of automobiles. The gasket may be formed around the entire periphery of the window glass or a part of it. For instance, a gasket may be formed one, two or three side areas when a rectangular glass sheet is used. Most preferably, the gasket is formed around the entire periphery.

It is desirable that the gasket is made of a synthetic resin or a rubber, especially, an elastomer or a soft synthetic resin. The gasket material injected into the shaping mold is preferably a melt of a synthetic resin or a mixture of fluid synthetic resin materials capable of forming a synthetic resin when reacted in the mold. As the former, for instance, a molten soft vinyl chloride resin, a thermoplastic polyester elastomer, a styrene-diene thermoplastic elastomer, an ethylene-unsaturated carboxylic acid copolymer may be used. However, the gasket material used is not limited to the above-mentioned materials. The synthetic resin obtained from the later mixture of materials, includes, for example, a polyurethane elastomer, a polyurethane-urea elastomer, a polyurea elastomer, a polyamide resin, an epoxy resin, and an unsaturated polyester resin. However, the mixture of materials are not limited to the above.

As injection molding by using the shaping mold according to the present invention, reaction injection molding (RIM) is especially preferable. This method is a kind of method for injection-molding a mixture of materials wherein material components are quickly mixed and injected into the shaping mold and the mixture is rapidly reacted in the shaping mold to thereby obtain a synthetic resin molded product. In this method, the flow characteristics in the gasket forming cavity is excellent in comparison with an injection molding method for a molten synthetic resin. Further, since the inner pressure of the gasket forming cavity is low, it is extremely suitable as a method for forming a gasket at the peripheral portion of the glass sheet in the shaping mold. As the material for the gasket formed by the reaction injection molding, the above-mentioned polyurethane elastomer, polyurethane-urea elastomer and polyurea elastomer are preferably used. Such materials are obtained by using a compound having at least two active hydrogen-containing functional groups selected from hydroxyl groups, primary amino groups and secondary amino groups and a compound having at least two isocyanate groups, as reactive (starting) materials.

The above-mentioned elastomer is formed by injecting such two types of reactive (starting) materials which are mixed at the time of injection, and by reacting the two types of compounds in the shaping mold. Preferred as the compound having at least two active hydrogen-containing functional groups, is a combination of a high molecular weight active hydrogen compound having a molecular weight of at least 800, preferably from 1,000 to 4,000, per functional group, and from 2 to 8 functional groups, preferably from 2 to 4 functional groups, per molecule, with a chain extender (i.e. a compound having from 2 to 8 functional groups, preferably from 2 or 3 functional groups, and a low molecular weight, particularly of at most 400). Specifically, a polyether polyol, polyether polyamine, a polyester polyol, a hydroxyl-group-containing hydrocarbon polymer or other high molecular weight active hydrogen compounds which are liquid at room temperature or under heating for the injection molding (at most 60° C.), and a chain extender such as ethylene glycol, 1,4-butanediol, diethyl toluenediamine or monochlorodiaminobenzene, may be mentioned. Such high molecular weight active hydrogen compound and chain extenders may be used in combination in two or more different types, respectively. As an especially preferable high molecular weight active hydrogen compound, polyether active hydrogen compound such as a polyether polyol or a polyether polyamine may be used. As a preferable chain extender, a diol or diamine may be used. As the compound having at least two isocyante groups, diphenylmethane diisocyanate, polymethylenepolyphenyl isocyanate, tolylene diisocyanate, isophorone diisocyanate, hexamethylene diisocyanate, or polyisocyanate or modified products thereof (such as carbodiimide-modified products, prepolymer-type modified products, nurate modified products) may be preferably used. The above-mentioned reactive materials may be used with other submaterials. As the submaterials, catalyst, filler, reinforcing agent, stabilizer (ultraviolet absorber, a light stabilizer or an antioxidant) coloring agent, foaming agent and so on may be used.

EXAMPLE

Figure 6:
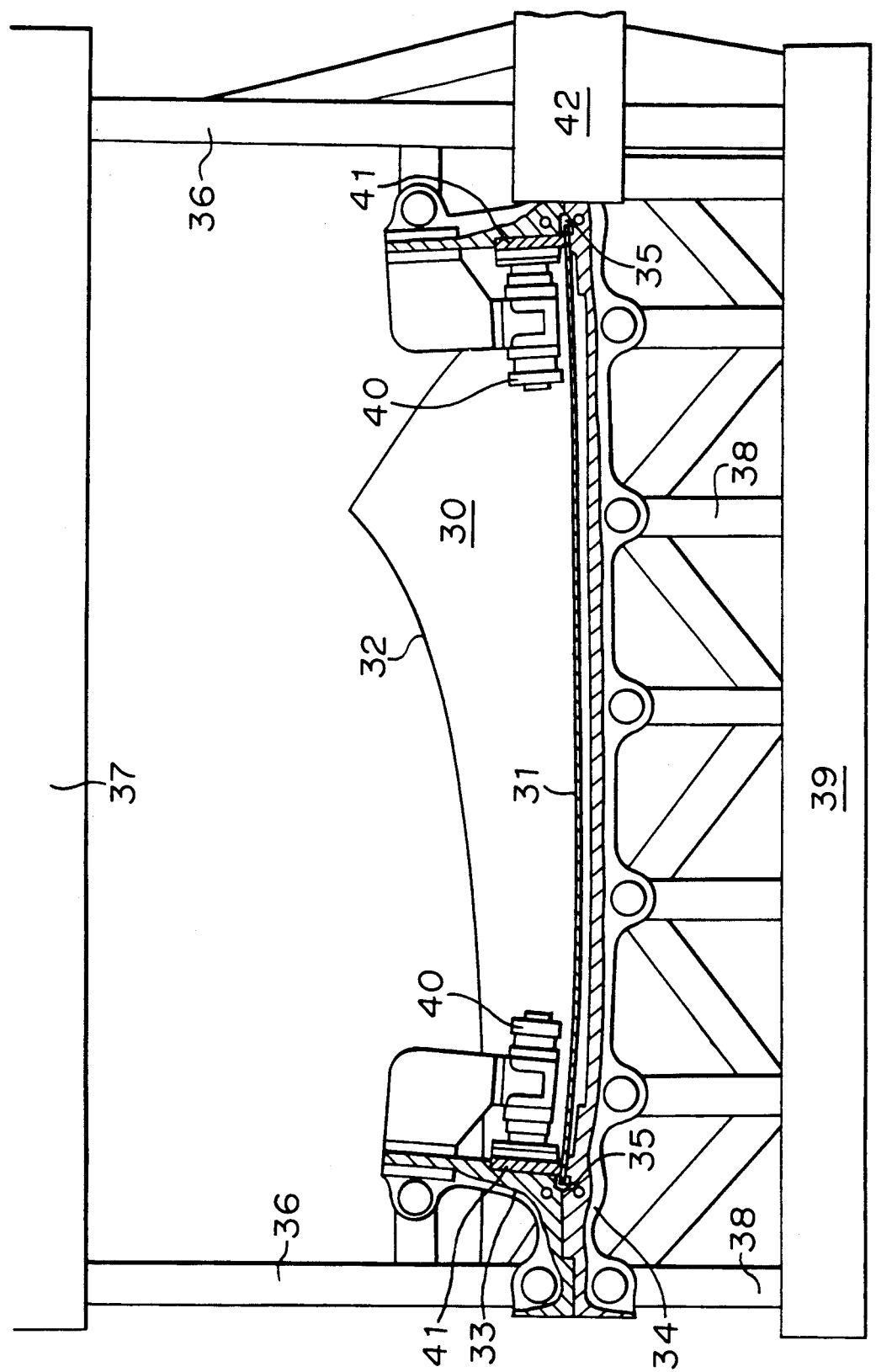
FIG. 6 is an enlarged cross-sectional view partly omitted of an embodiment of the shaping mold of the present invention.
Figure 7:
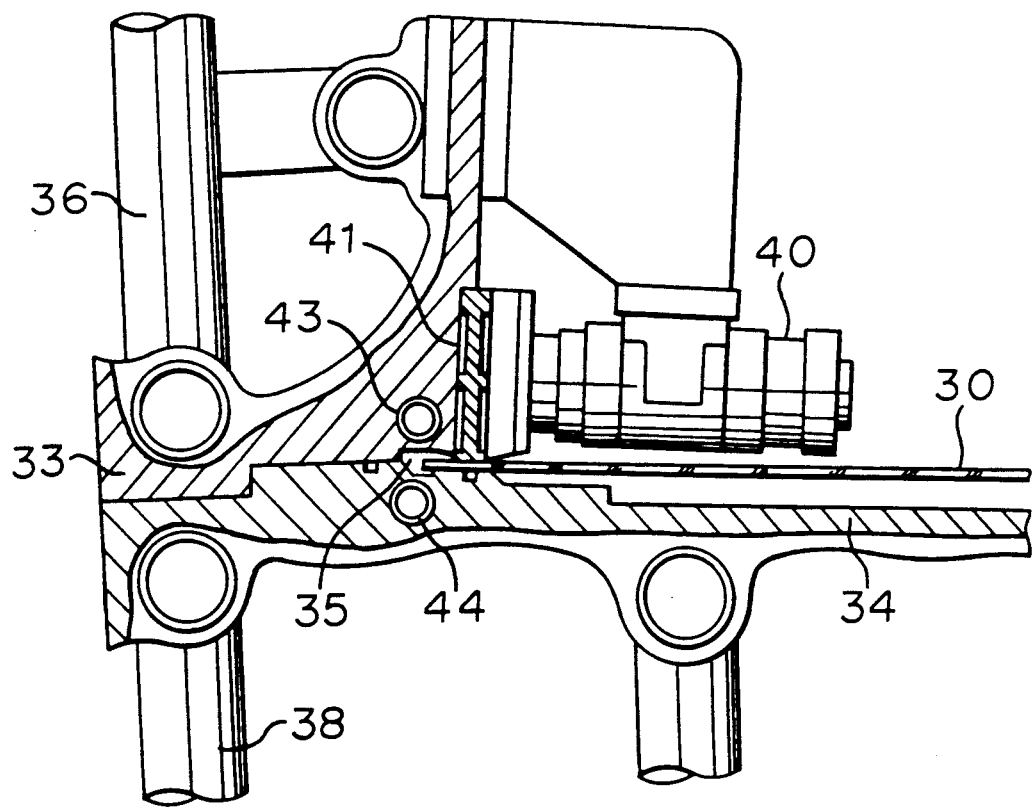
FIG. 7 is an enlarged cross-sectional view of an important part of the embodiment as shown in FIG. 6.

FIG. 6 is a cross-sectional view showing an important part of an embodiment of the shaping mold in which a glass sheet for window is placed, and FIG. 7 is an enlarged cross-sectional view of a part as in FIG. 6. The glass sheet is for a front window glass for an automobile. In FIG. 6, the window glass is shown under the condition that it is cut in the vertical direction at its central portion and the shaping mold is also cross-sectioned in correspondence to the cut portion of the glass sheet.

The glass sheet 30 is shown by the area cross-sectioned 31 and the line of contour 32. The shaping mold comprises an upper mold part 33 and a lower mold part 34. FIG. 6 shows that the upper and lower mold parts are assembled in which the glass sheet 30 is placed. The entire peripheral portion of the glass sheet 30 is surrounded by the shaping mold although the peripheral portion is omitted. Also, air cylinders, which will be described hereinbelow, attached to the upper mold part 33 are omitted except two cylinders.

The upper mold part 33 covers the entire peripheral portion of the glass sheet 30 and the central portion of the glass sheet 30 is open in a form of frame. The lower mold part 34 also covers the entire peripheral portion of the glass sheet 30 so as to correspond to the upper mold part, and the central portion of it is not open so that the central portion of the lower mold part constitutes a table. As shown in FIG. 7, a gasket forming cavity 35 is defined by the upper and lower mold parts 33, 34 and the circumferential portion of the glass sheet 30.

The upper mold part 33 is attached to the upper table of a mold-fastening press machine by means of a supporting frame 36, 37 and the lower mold part 34 is attached to the lower table of the press machine by means of a supporting frame 38, 39. A pushing means comprises a plurality of air cylinders 40, attached to the upper mold part 33, which push resilient sealing members 41 to the side surfaces of the upper mold part 33. A gasket material is injected to the gasket forming cavity 35 by using an injection molding machine for producing polyurethane elastomer molding products by reaction injection molding.

The gasket material injected from the injection molding machine flows into the cavity 35 through a gate block 42 which includes an after-mixer and a runner.

As shown in FIG. 7, the air cylinders 40 push the resilient sealing members 41 to a surface of the glass sheet 30 in the direction substantially parallel to the surface and against the inner pressure of the cavity (i.e. the direction from the central portion to the peripheral portion of the glass sheet), whereby sealing effect at the contacting portion between the resilient sealing members 41 and the glass sheet 30 is increased, and leakage of the gasket material from the gasket forming cavity 35 to the contacting surface formed by the resilient sealing member 40 and the upper mold part 33 via the upper surface of the glass sheet 30 can be prevented. Pipes 43, 44 near the cavity 35 in the mold parts 33, 34 constitute respectively conduits for passing a heat medium for heating or cooling the cavity 35.

Window glass with a gasket is produced as follows. The glass sheet 30 is placed on the lower mold part 34 of the shaping mold in an open state and the upper mold part 33 is moved downwardly to assemble them. The air cylinders 40 and the resilient sealing members 41 are attached to the upper mold part 33 in a state as shown in FIGS. 6 and 7. After the upper and lower mold parts 33, 34 have been completely assembled, the air cylinders 40 are actuated to push the resilient sealing members 41 toward the inner side surfaces of the upper mold part. The pushing force is previously adjusted so that the glass sheet is not broken and sufficient sealing effect can be obtained. FIGS. 6 and 7 show such condition.

Then, the gasket material is injected from the injection molding machine. When the material fills the gasket forming cavity 35, the injection is stopped. The shaping mold is kept in a state as shown in FIGS. 6 and 7 until the gasket material injected cures. The heat medium is passed through the pipes 43, 44 to heat for acceleration of curing the gasket material in the cavity 35, if necessary. After the gasket material has cured, the air cylinders 40 are deenergized, and the upper mold part 33 is moved upwardly to open the shaping mold so that the window glass with gasket thus shaped is removed.

Figure 8:
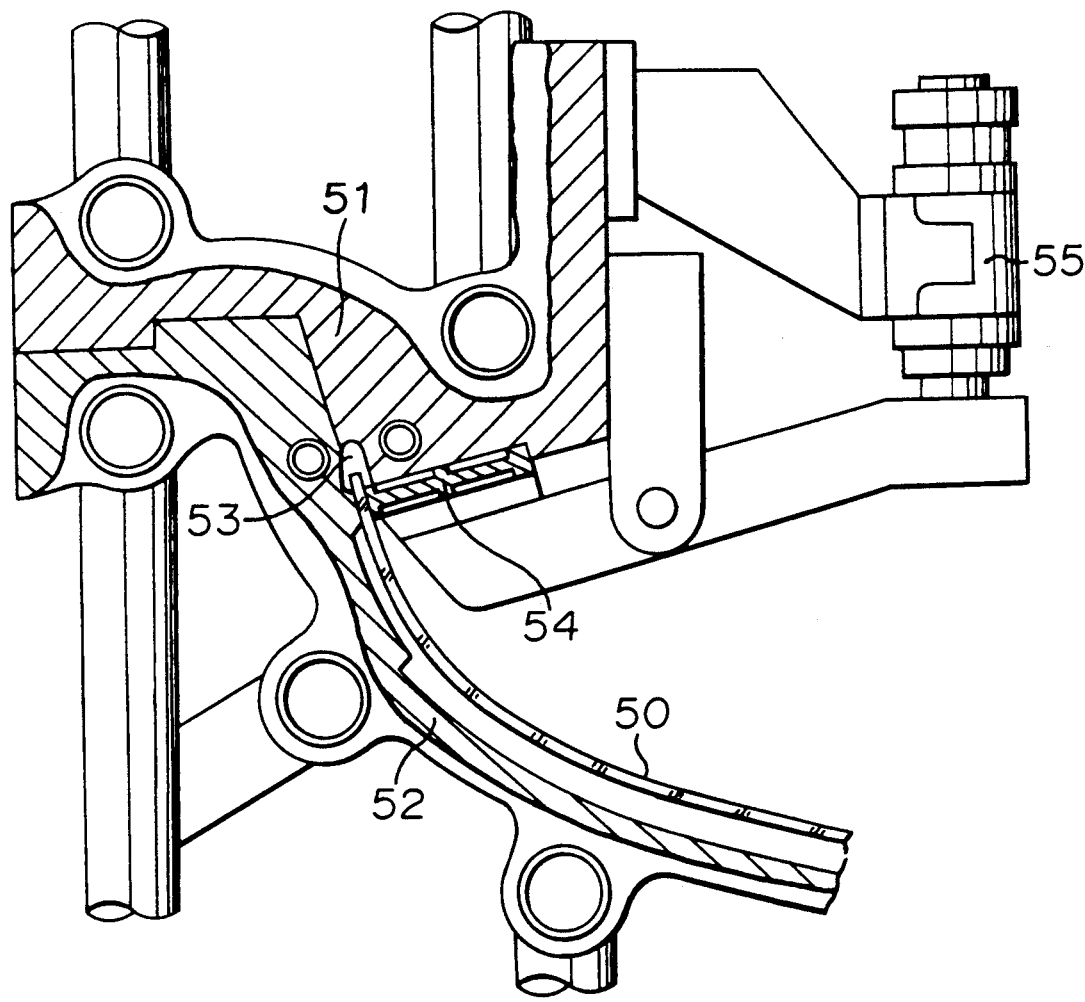
FIG. 8 is an enlarged cross-sectional view partly omitted of another embodiment of the shaping mold of the present invention.

FIG. 8 is an enlarged cross-sectional view of an important part of an embodiment of the shaping mold of the present invention. A glass sheet 50 is for window glass for an automobile, which is obtained by deep-bending a glass plate. The shaping mold comprises an upper mold part 51 and a lower mold part 52 having the same construction as that shown in FIGS. 6 and 7. A gasket forming cavity 53 is defined by the upper and lower mold parts 51, 52 and the peripheral portion of the glass sheet 50. A resilient sealing member 54 is pushed to the upper mold part 51 in the direction substantially parallel to a surface of the glass sheet 50 and against the inner pressure of the cavity by the action of a lever by actuating an air cylinder 55.

As described above, in accordance with the present invention, a concentrated stress caused by unevenness in shape of the glass sheet can be eliminated, hence the breakage of the glass sheet can be prevented by providing the resilient sealing member at a portion where the shaping mold is in contact with the glass sheet. Further, sealing effect at the contacting surface between the shaping mold and the glass sheet is improved to thereby eliminate occurrence of burrs. In addition, in the present invention, the resilient sealing member is pushed to the inner surface of the shaping mold by using the hydraulic cylinder, the spring, the slide mechanism motor and so on. Accordingly, entrance of the injection material between the resilient sealing member and the shaping mold can be prevented, and excellent mold release characteristics can be obtained. Further, a window glass sheet with a gasket having good appearance can be obtained.

What is claimed is:

1. A method of preparing window glass provided with a gasket at a peripheral portion of a glass sheet for a window comprising the sequential steps of:

placing a glass sheet in a shaping mold which comprises at least two mold parts to provide an inner cavity in which at least one resilient sealing member is attached to at least one of said two mold parts so as to come in contact with a surface of said glass sheet so that a gasket forming cavity is formed at a peripheral area of said glass sheet by the cooperation of the inner cavity of the shaping mold, the resilient sealing member and the glass sheet, subsequently pushing said resilient sealing member against a contacting surface comprising a part of the shaping mold acting in a direction substantially parallel to the surface of the glass sheet in contact with the resilient sealing member in said inner cavity by means of a pushing means no earlier than the assembling of said shaping mold and said glass sheet, and injecting a gasket material into said gasket forming cavity to form a gasket.

2. The method of preparing window glass provided with a gasket according to claim 1, wherein said resilient sealing member is pushed by another pushing means which is different from a pushing means for assembling said mold parts.

3. The method of preparing window glass provided with a gasket according to claim 2, wherein said resilient sealing member is pushed by a pushing means attached to a part of said shaping mold.

4. The method of preparing window glass provided with a gasket according to claim 3, wherein said pushing means is a hydraulic-pressure-driven cylinder.

5. The method of preparing window glass provided with a gasket according to claim 1, wherein said shaping mold consists of two mold parts at least one of which is provided with said resilient sealing member and a plurality of the pushing means.

6. The method of preparing window glass provided with a gasket according to claim 1, wherein said shaping mold consists of two mold parts, and the direction of pushing said resilient sealing member to the surface of said glass sheet is not the same as the direction of matching said two mold parts.

7. The method of preparing window glass provided with a gasket according to claim 1, wherein said gasket material is a synthetic resin material which forms a plastic resin by reaction, and the method of forming a gasket by injecting said gasket material is a reaction injection molding method.

8. The method of preparing window glass provided with a gasket according to claim 1, wherein said two mold parts of the shaping mold are assembled together with said glass sheet.

9. A method of preparing window glass provided with a gasket at a peripheral portion of a glass sheet for a window comprising the sequential steps of:

placing a glass sheet in a shaping mold which comprises at least two mold parts to provide an inner cavity in which at least one resilient sealing member is attached to at least one of said two mold parts so as to come in contact with a surface of said glass sheet so that a gasket forming cavity is formed at a peripheral area of said glass sheet by the cooperation of the inner cavity of the shaping mold, the resilient sealing member and the glass sheet, subsequently pushing said resilient sealing member against a part of the inner cavity wall of said shaping mold in a direction other than perpendicular to the surface of said glass sheet to which said resilient sealing member contacts to thereby push said resilient sealing member to said glass sheet, and injecting a gasket material into said gasket forming cavity to form a gasket.

10. The method of preparing window glass with a gasket according to claim 9, wherein said resilient sealing member is pushed against the surface of said glass sheet by a pressure caused by the deformation of the pushed resilient sealing member.

11. The method of preparing window glass provided with a gasket according to claim 9, wherein said resilient member is pushed in the direction substantially parallel to the surface of said glass sheet to which said resilient sealing member contacts.

12. The method of preparing window glass provided with a gasket according to claim 9, wherein said shaping mold consists of two mold parts, and the direction of pushing said resilient sealing member to the surface of said glass sheet is not the same as the direction of matching said two mold parts.

13. The method of preparing window glass provided with a gasket according to claim 9, wherein said resilient sealing member is pushed by another pushing means which is different from a pushing means for assembling said mold parts.

14. The method of preparing window glass provided with a gasket according to claim 13, wherein said different pushing means is a hydraulic-pressure-driven cylinder.

15. The method of preparing window glass provided with a gasket according to claim 9, wherein said shaping mold consists of two mold parts at least one of which is provided with said resilient sealing member and a plurality of the pushing means.

16. The method of preparing window glass provided with a gasket according to claim 9, wherein said gasket material is a synthetic resin material which forms a plastic resin by reaction, and the method of forming a gasket by injecting said gasket material is a reaction injection molding method.

* * * * *